(12) United States Patent
Kishi (10) Patent No.: US 6,269,423 B1
(45) Date of Patent: Jul. 31, 2001

(54) METHOD AND APPARATUS FOR PROVIDING IMPROVED CACHING FOR A VIRTUAL TAPE SERVER

(75) Inventor: Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/078,181

(22) Filed: May 13, 1998

(51) Int. Cl.$^7$ ................................................. G06F 12/00
(52) U.S. Cl. ........................... 711/113; 711/114; 707/204
(58) Field of Search ........................ 711/113, 111, 112, 711/114, 118; 707/204; 360/45

(56) References Cited

U.S. PATENT DOCUMENTS

| | | |
|---|---|---|
| 4,467,421 * | 8/1984 | White .................................. 711/118 |
| 4,811,203 | 3/1989 | Hamstra . |
| 5,043,885 | 8/1991 | Robinson . |
| 5,155,835 * | 10/1992 | Belsan ................................. 711/114 |
| 5,513,336 | 4/1996 | Vishlitzky et al. . |
| 5,619,675 | 4/1997 | De Martine et al. . |
| 5,737,141 * | 4/1998 | Hardwick et al. ...................... 360/45 |
| 5,809,511 * | 9/1998 | Peake ................................... 707/204 |
| 5,911,148 * | 6/1999 | Anglin et al. .......................... 711/111 |

OTHER PUBLICATIONS

"Direct Access Storage Device Cache Segment Management," *IBM® Technical Disclosure Bulletin*, 37(08):473–477 (Aug. 1994).

* cited by examiner

*Primary Examiner*—Hiep T. Nguyen
*Assistant Examiner*—Nasser Moazzami
(74) *Attorney, Agent, or Firm*—Altera Law Group, LLC (57) ABSTRACT

A method and apparatus for improving caching for a virtual tape server is disclosed. The method and apparatus improve caching by making assumptions to increase cache hits, but which do not cause the virtual tape server to under-perform when these assumptions prove to be incorrect. The method includes the steps of correlating logical volume usage to externally determined file characteristics to derive usage histories for cached logical volumes, maintaining a record of the histories for the files that share the same predefined characteristics, and managing the migration of the logical volumes according to the usage history and the externally determined file characteristics of the logical volume. The correlation is accomplished by associating the first logical volume with a logical volume type based on predefined characteristics, assigning a time bin for the type of the first logical volume based on the time of last access of the first logical volume therein and based on the type assigned to the first logical volume at the time the first logical volume was last accessed and updating a usage count in the time bin for the type. Scores for each logical volume in the cache are updated by determining the age and type of each logical volume, selecting appropriate time buckets for the logical volume, calculating a usage score for the time buckets, computing time-weighted usage scores for the time buckets and identifying a final score for the logical volume. The logical volume with the lowest score is the next volume to be discarded from the cache.

45 Claims, 5 Drawing Sheets

Historic usage table — 400

| | Re-access-> | 0-2hr | 2-4hr | 4-6hr | ..... | misses |
|---|---|---|---|---|---|---|
| 410 | TypeA | 10 | 0 | 0 | | 10 — 440 |
| 420 | TypeB | 0 | 0 | 10 | | 10 — 460 |

First score step (usage score) — 500
514, 516, 518

| | Re-access-> | 0-2hr | 2-4hr | 4-6hr |
|---|---|---|---|---|
| 510 | VOLA | 500 | 500 | 500 |
| 520 | VOLB | 0 | 0 | 500 |

Second score step (time_weighted usage) — 600

| | Re-access-> | 0-2hr | 2-4hr | 4-6hr |
|---|---|---|---|---|
| 610 | VOLA | 500 | 250 | 167 |
| 620 | VOLB | 0 | 0 | 167 |

FIG. 7

Third step = size weighted = second step (1MB assumed)
Max score for volume

| | | |
|---|---|---|
| 720 — VOLA | 500 | — 710 |
| VOLB | 167 | — 712 |

TIME = 2-4 hr after close
score(m) table (scaling constant = 1000)
First score step (usage score) — 810

| Re-access-> | 0-2hr | 2-4hr | 4-6hr |
|---|---|---|---|
| VOLA | X | 0 | 0 |
| VOLB | X | 0 | 500 |

Second score step (time_weighted usage) — 820

| Re-access-> | 0-2hr | 2-4hr | 4-6hr |
|---|---|---|---|
| VOLA | X | 0 | 0 |
| VOLB | X | 0 | 250 |

Third step = size weighted = second step (1MB assumed)
Max score for volume

| | |
|---|---|
| VOLA | 0 |
| VOLB | 250 |

Score summary (max score) — 900
914, 920, 922, 926

| | Age -> | 0-2hr | 2-4hr | 4-6hr |
|---|---|---|---|---|
| 910 | VOLA | 500 | 0 | 0 — 916 |
| 930 | VOLB | 167 | 250 | 500 — 944 |

METHOD AND APPARATUS FOR PROVIDING IMPROVED CACHING FOR A VIRTUAL TAPE SERVER

BACKGROUND OF THE INVENTION

1. Field of the Invention.

This invention relates in general to data storage and processing, and more particularly to distributed storage servers.

2. Description of Related Art.

The implementation of new technology in magnetic tape products has meant that the density of data written to tape has increased by orders of magnitude in the last ten or fifteen years. The ability to record high density tapes, e.g., ten gigabytes or more on one physical volume, has led to reducing costs in physical tape hardware as well as in handling and management resources.

However, over the past five years, tape data set stacking products, i.e., software solutions to increase tape utilization, have evolved in response to the customer requirement for more efficient ways to manage the information stored on tape. To achieve increased capacity enablement, a virtual tape server (VTS) has been proposed. In a VTS, the hardware is transparent to the host and the user. The VTS requires little external management except though the library management element of the tape library into which a VTS is integrated.

In a hierarchical storage systems, such as a VTS, intensively used and frequently accessed data is stored in fast but expensive memory. One example of a fast memory is a direct access storage device (DASD). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

In the VTS system, a host data interface, a DASD file buffer, and a number of tape devices are provided. When the host writes a logical volume, or a file, to the VTS, the data is stored as a resident file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume, typically the oldest, is removed from the DASD to free space for more logical volumes. If the selected logical volume has not already been appended to a tape cartridge or a physical volume, it is appended to a tape cartridge prior being removed from the DASD. A file that has been appended to a tape and removed from the DASD is "migrated." Optionally, any time prior to being removed from the DASD, a DASD file can be appended onto a tape cartridge with the original left on the DASD for possible cache hits. A file that has been appended to a tape cartridge while its original is left on the DASD is said to be premigrated.

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape (recall).

Tape servers may use an engine to move data between the DASD and tape drives in a virtual tape server (VTS) environment. For example, the IBM Virtual Tape Server (VTS) uses the IBM Adstar Distributed Storage Manager (ADSM) as its engine to move data between the DASD and IBM 3590 tape drives on the VTS. In such a system, the VTS uses the storage manager client on the DASD, e.g., the ADSM Hierarchical Storage Manager (HSM) client, and a distributed storage manager server attached to the tape drives to provide this function.

Since recalls take a long time relative to "cache hits," it would be preferably to have as many logical volumes as possible be cache hits. In order to accomplish this a logical volume caching method is used.

Typically the logical volumes in the cache are managed on an FIFO (first in first out) or LRU (least recently used) algorithm. However, each of these methods exhibits one or more disadvantages: the methods do not discern patterns, the methods are not adaptive, or the methods do not improve upon the cache hit rate.

It can be seen that there is a need for a method and apparatus for improving caching for a virtual tape server.

It can also be seen that there is a need for a method and apparatus for improving caching for a virtual tape server which makes assumptions to increase cache hits, but which does not under-perform a LRU algorithm when these assumptions prove to be incorrect.

SUMMARY OF THE INVENTION

To overcome the limitations in the prior art described above, and to overcome other limitations that will become apparent upon reading and understanding the present specification, the present invention discloses a method and apparatus for improving caching for a virtual tape server.

The present invention solves the above-described problems by providing a method and apparatus for improving caching for a virtual tape server which makes assumptions to increase cache hits, but which does not under-perform a LRU algorithm when these assumptions prove to be incorrect.

A method in accordance with the principles of the present invention includes the steps of correlating logical volume usage to externally determined file characteristics to derive a usage history for cached logical volumes, maintaining a record of the usage history in time bins and managing the migration of the logical volumes according to the usage history and the externally determined file characteristics of the logical volume.

Other embodiments of a system in accordance with the principles of the invention may include alternative or optional additional aspects. One such aspect of the present invention is that the step of correlating further includes the steps of associating the first logical volume with a logical volume type based on predefined characteristics, assigning a time bin for the type of the first logical volume based on the time of last access of the first logical volume therein, the time of the current access of the first logical volume, and based on the type assigned to the first logical volume at the time the first logical volume was last accessed and updating a usage count in the time bin for the type.

Another aspect of the present invention is that the method further includes the step of calculating a score for a logical volume based upon the size of the first logical volume, the age of the first logical volume, and the historic performance of the other volumes.

Another aspect of the present invention is that the time bin has data associated therewith, the data in the time bin for the first logical volume being divided by a predetermined number to prevent overrun and to maintain weighted historic data when a total for all time bins reaches a predetermined threshold.

Another aspect of the present invention is that the score is updated periodically for any cached volume as the cached volume ages.

Another aspect of the present invention is that the score is updated periodically for all cached volumes.

Yet another aspect of the present invention is that the step of updating the score further comprises the steps of determining the age and type of each logical volume, selecting an mth time bucket for the logical volume, calculating a usage score for a time bucket, computing a time-weighted usage score for the time bucket and identifying a final score for the time bucket.

Another aspect of the present invention is that the usage score comprises calculating a usage score for all nth time buckets, n>m, wherein the mth time bucket is a current time bucket, and wherein the usage score comprises a scaling constant times the sum of the time buckets for the logical volume between n and m divided by the sum of all time buckets greater than or equal to m plus a number of misses.

Another aspect of the present invention is that the usage score is proportional to the percentage of cache hits when the cartridge is kept for n−m+1 time intervals.

Another aspect of the present invention is that the time-weighted usage score for the nth time bucket is equal to the usage score for the nth bucket divided by n−m+1.

Another aspect of the present invention is that the final score for the logical volume is equal to the maximum of the time-weighted usage score for the nth time buckets.

Another aspect of the present invention is that the final score for the logical volume may be equal to the time-weighted usage score for the logical volume divided by the size of the logical volume.

Still another aspect of the present invention is that the method further includes the step of processing logical volumes having an age in excess of a predetermined maximum period, e.g., twenty-four hours, according to a size-weighted least recently used basis.

Another aspect of the present invention is that the method further includes the steps of assigning logical volumes having no historic data a 50% hit rate in the first time bucket, and setting the score equal to minus the age of the cartridge times its size, or assigning logical volumes having no historic data an average score for all logical volumes.

Another aspect of the present invention is that the step of managing the migration of the logical volumes according to the usage history and the externally determined file characteristics of the logical volume further comprises the step of migrating a logical volume having the lowest score first.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for improving caching for a virtual tape server which makes assumptions to increase cache hits, but which does not under-perform when these assumptions prove to be incorrect.

Figure 1:
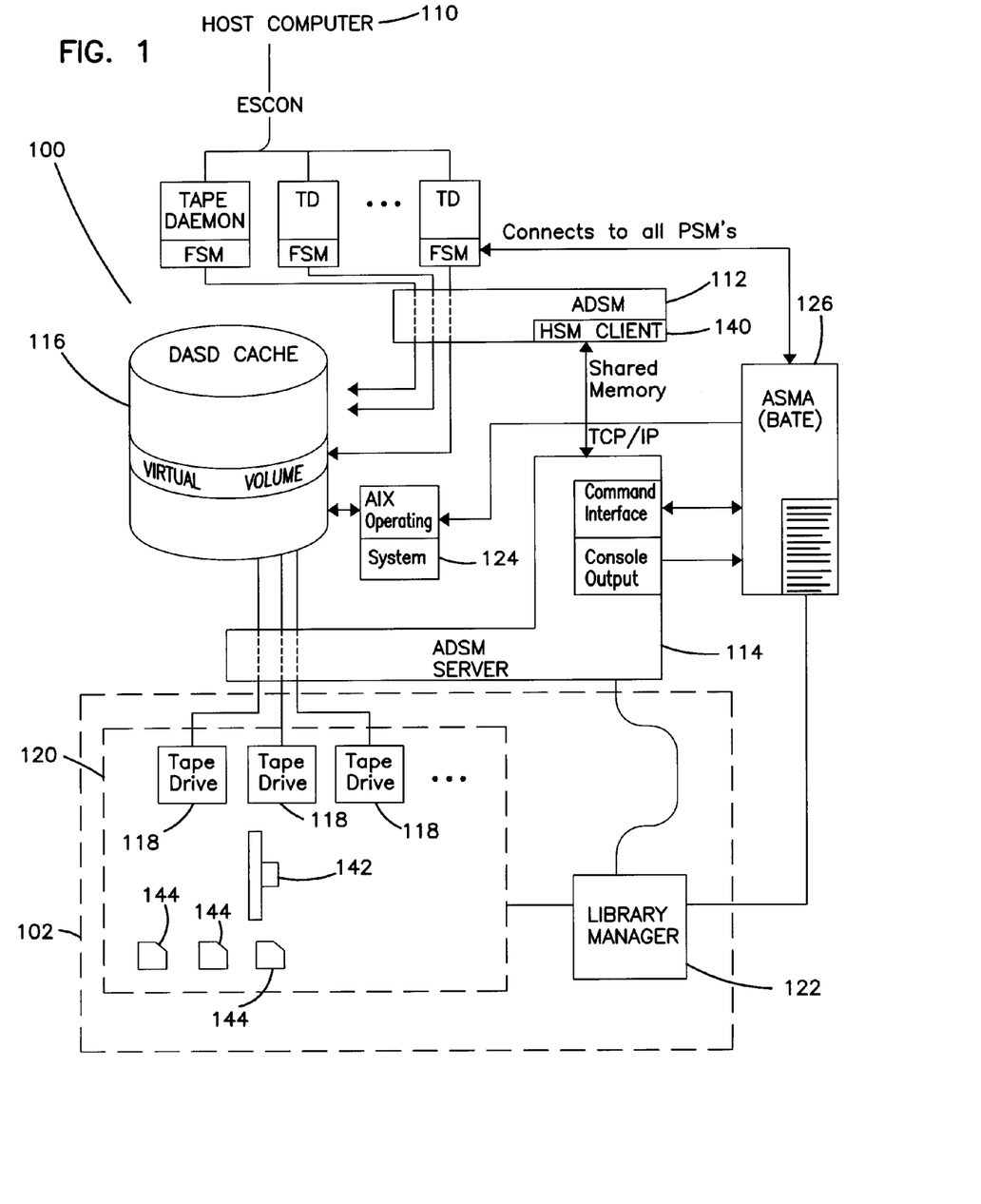
FIG. 1 illustrates a virtual tape server system 100 according to the present invention.

FIG. 1 illustrates a virtual tape server system 100 according to the present invention. The virtual tape server attaches to a host computer 110, and includes a distributed storage manager client 112, an distributed storage manager server 114, DASD cache 116, a plurality of tape drives 118 forming an automated library 120, a library manager 122, an operating system 124 and an automatic storage manager administrator 126.

In the VTS 100, intensively used and frequently accessed data is stored in fast but expensive memory, such as direct access storage devices (DASD) 116. In contrast, less frequently accessed data is stored in less expensive but slower memory, such as tape drives 118.

A VTS 100 uses an engine 114 to move data between the DASD 116 and tape drives 118. For example, the IBM Virtual Tape Server (VTS) uses the IBM Adstar Distributed Storage Manager (ADSM) as its engine to move data between the DASD and IBM 3590 tape drives on the VTS. In such a system, the VTS 100 uses the a storage manager client 112, e.g., the ADSM Hierarchical Storage Manager (HSM) client, and a distributed storage manager server 114 attached to the tape drives 118 to provide this function. The library manager 122, via commands from the distributed storage manager server 114, controls an accessor 142 which accesses individual tapes 144.

Since recalls take a long time relative to "cache hits," any improvement would ensure that the number of logical volumes that are cache hits is maximized. However, as mentioned above, prior storage managers managed the logical volumes in the cache on an FIFO (first in first out) or LRU (least recently used) algorithm. Accordingly, each of these methods exhibits one or more disadvantages: the methods do not discern patterns in the cache hits, the methods are not adaptive, or the methods do not improve upon the cache hit rate.

The present invention assumes that files with different characteristics are used differently, that is the host usage of different files has different trends that can be correlated to some externally determined file characteristics. If this assumption is incorrect, as it could be for some customers, the algorithm will function like an LRU algorithm based upon gathered historical data. Therefore, in customers where these predetermined file characteristics have a high correlation with file usage, the method according to the present invention provides an improvement in the cache hit rate which out-performs the LRU algorithms. For those customers that do not have a high correlation, the method according to the present invention does not under-perform an LRU algorithm.

Figure 2:
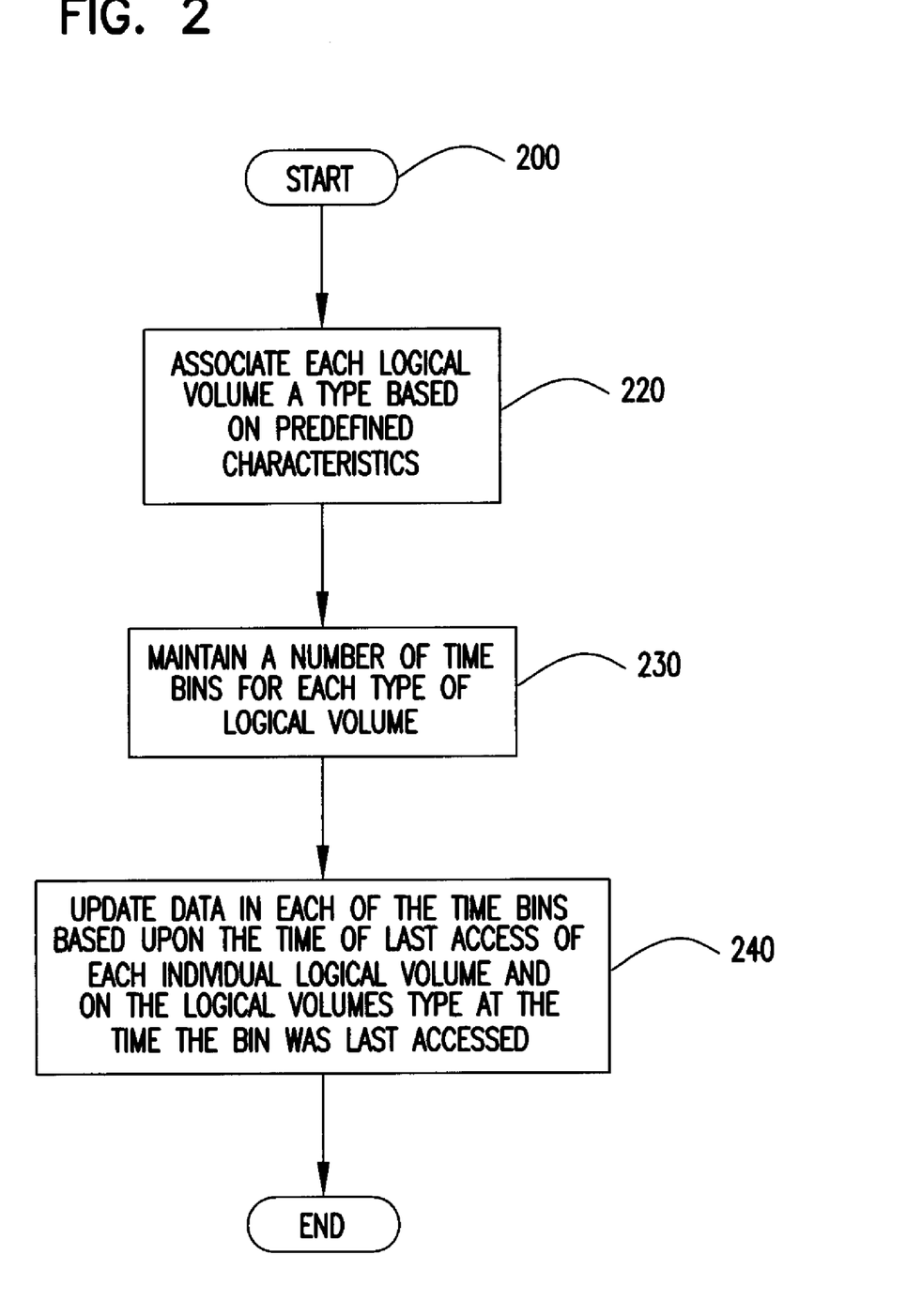
FIG. 2 illustrates a flow chart of the management of logical volumes in the cache according to the present invention.

FIG. 2 illustrates a flow chart 200 of the management of logical volumes in the cache according to the present invention. Each logical volume is associated with a "type" based on predefined characteristics 220.

These characteristics 220 are used to sort out logical volume usage, assuming that volumes with similar characteristics will have different cache usage than volumes with different characteristics. Characteristics 220 that can be used are the day of the week the file was used, the time of day the file was used, the type of file usage (i.e., newly created, file not modified, file modified), the type of data usage (i.e., read only, write only, read-write), the number of megabytes of data transferred, and the length of time the file was resident on the virtual tape drive. Other attributes that can be useful are the dataset names in the file, the number of datasets used, etc.

Every time a file is used, its type is determined, and its time of last usage is stored. If the file is not used within a specified maximum period, an entry in the "miss" bucket for that type of file is incremented and the entry for the file is discarded. If the file is used within the maximum time period, the appropriate time bucket for the type of file is incremented, the old entry for the file is discarded, and a new entry for the type of file representing the current usage of the file is stored.

For each type of logical volume a number of time bins are kept 230. For instance in the IBM VTS, 12 time bins are kept, each representing the number of volumes of each type that were reaccessed in 2 hour intervals (e.g. bin0=bin0–2 hr, bin1=2–4 hr, etc.). One additional bin for each type of logical volumes keeps the count of the number of volumes that were not reaccessed within a 24 hour period.

As mounts are processed, the data in these bins are updated based on the time of last access of each individual logical volume, the time of the current access of the first logical volume, and based on the logical volumes type at the time it was last accessed 240. Data on the last use of specific logical volumes must only be kept up to the maximum time of the last timed bin—in this case 24 hours. To prevent overrun, and to maintain weighted historic data, all the timed data for a particular type of logical volume is divided by 2 whenever the total entries in all the time bins reaches an appropriate threshold (based upon the maximum value for the data type used for each bin (i.e. integer, long, etc.)).

Figure 3:
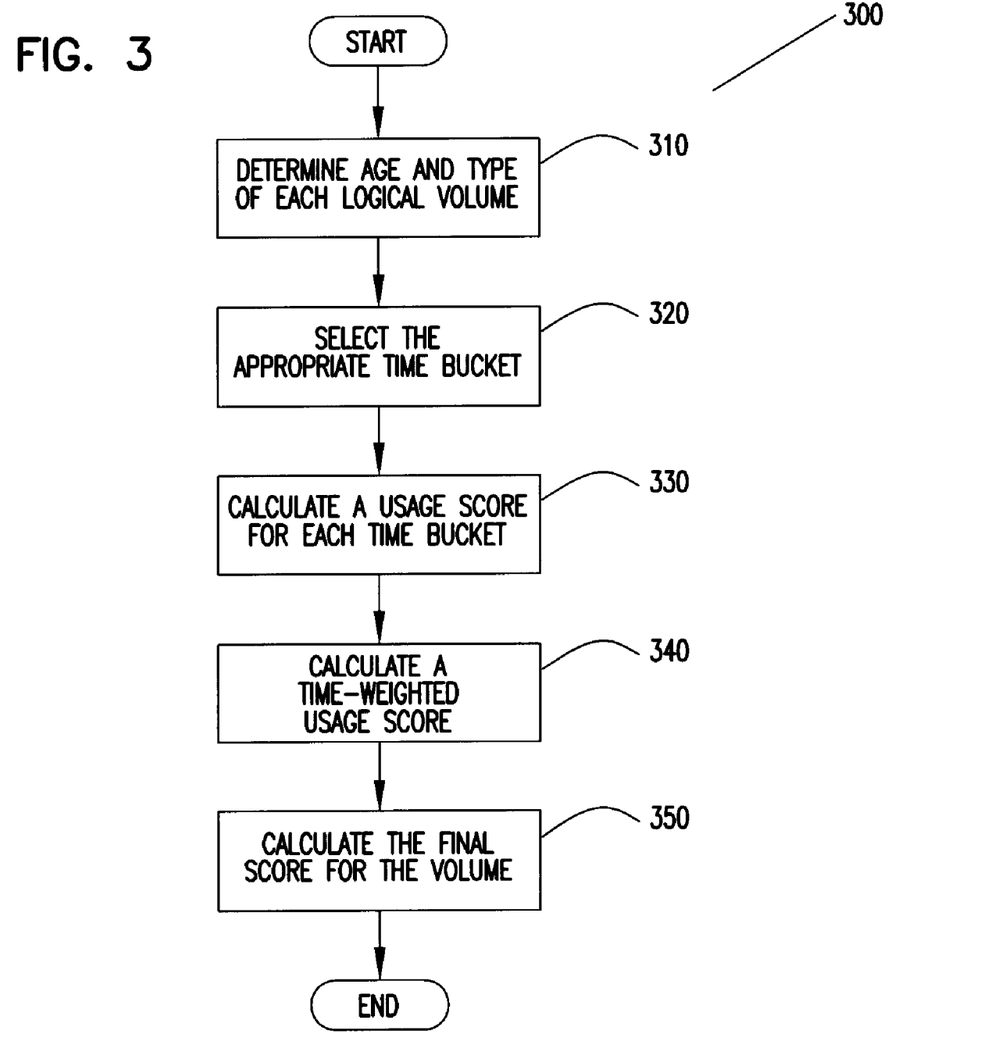
FIG. 3 is a flow chart illustrating the calculations of the updated scores according to the present invention.

FIG. 3 is a flow chart 300 illustrating the calculations of the scores according to the present invention. The updates to the scores can be performed every two hours for any cached volume as it ages in the cache, or periodically for all cached volumes. First, the age and type of each logical volume is determined 310 and the appropriate time bucket is selected 320. For that time bucket (t(m)), and for every time bucket (t(n)) up to and including the 24 hour bucket t(max), a usage score (score(n)) is calculated 330. The usage score equals a scaling constant (for integer math) times the sum of all entries in buckets t(m) through t(n) inclusive, divided by the sum of all time bucket entries greater than or equal to m, i.e., t(m) through t(max) inclusive plus the number of "misses".

This calculation provides a series of usage scores that is proportional to the percentage of cache hits if the cartridge were kept for n−m+1 time (2 hour) intervals. Because it is better to keep 2 cartridges that have a 50% chance of being used in 2 hours for 2 hours each (using 4 volume-hours in the cache) instead of 1 cartridge that has a 50% chance of being used in 4 hours for 4 hours (using the same 4 volume-hours), this usage score is time weighted 340. The new, time-weighted, usage score for each time bucket (score (n)) is equal to the usage score for that bucket divided by n−m+1, i.e., original score (n)/(n−m+1). The time-weighted usage score for the logical volume is calculated as the maximum of the previously calculated, individual time-weighted usage scores for the nth time buckets.

Optionally, because smaller volumes occupy less space in the cache and more volumes in the cache leads to a higher hit count, the final score is calculated 350. The final score for the volume can be set to be equal to the time-weighted usage score for the volume divided by the volume size. For those volumes which have been in the cache for 24 hours, the score is set equal to minus the age of the cartridge times its size. This means that these cartridges will be processed on a size-weighted LRU basis. For those volumes with no historic data, we currently assume a 50% hit rate in the first time bucket, then set the score equal to minus the age of the cartridge times its size. Alternatively, the average cartridge data could be computed and used for this cartridge. Finally, the final score for the logical volume may be calculated to equal to the maximum of the time-weighted score for the nth time buckets.

In this manner a single score value can be used to manage the volumes in the cache, with the lowest score volume being discarded whenever space is needed in the cache. The method according to the present invention learns because it builds tables on historic data, continually updating itself as new mounts occur. It is adaptive because it applies what is learned to change the scoring on specific types of logical volumes. If no historic difference is discerned between the various types of logical volumes, the data in the table will generate scores that will operate the cache on a size weighted LRU basis.

Figure 4:
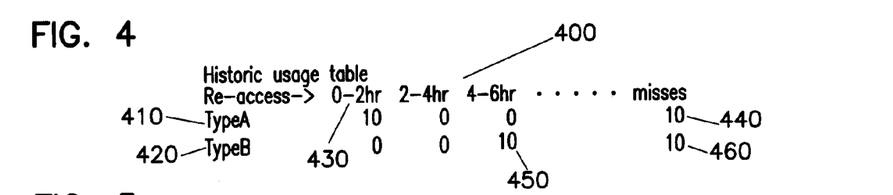
FIG. 4 illustrates a historic usage table.

The present invention is described further herein below with reference to one example. FIG. 4 illustrates a historic usage table 400. In FIG. 4, two files, TypeA 410 and TypeB 420, are shown. The first file 410 is illustrated as being accessed ten times in the 0–2 hour period 430 and experienced ten misses 440. The second file 420 was accessed ten times in the 4–6 hour period 450 and also experienced ten misses 460. The present example assumes that the two files 410, 420 were closed at the same time and that each files was a one megabyte file.

Figure 5:
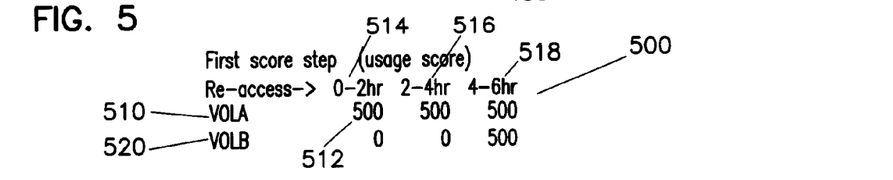
FIG. 5 illustrates the usage scoring for the 0–2 hour period.

FIG. 5 illustrates the usage scoring 500 for the 0–2 hour period, i.e., demonstrating calculations for files that are 0–2 hours old in the cache. A scaling constant of 1000 is used. In FIG. 5, the first file 510 has a usage score of five hundred 512 for the 0–2 hour 514, 2–4 hour 516, and the 4–6 hour 518 periods. The usage score of the first file 510 for the three periods 514, 516, 518 are calculated as follows:

$$0\text{-}2 \text{ hour} = \frac{10}{10(0\text{-}24 \text{ hour}) + 10(\text{misses})} \times 1000;$$

$$2\text{-}4 \text{ hour} = \frac{10 + 0}{10(0\text{-}24 \text{ hour}) + 10(\text{misses})} \times 1000;$$

$$4\text{-}6 \text{ hour} = \frac{10 + 0 + 0}{10(0\text{-}24 \text{ hour}) + 10(\text{misses})} \times 1000.$$

The usage score of the second file 520 for the three periods 514, 516, 518 are calculated as follows:

$$0\text{-}2 \text{ hour} = \frac{10}{10(0\text{-}24 \text{ hour}) + 10(\text{misses})} \times 1000;$$

$$2\text{-}4 \text{ hour} = \frac{0 + 0}{10(0\text{-}24 \text{ hour}) + 10(\text{misses})} \times 1000;$$

$$4\text{-}6 \text{ hour} = \frac{0 + 0 + 10}{10(0\text{-}24 \text{ hour}) + 10(\text{misses})} \times 1000.$$

Figure 6:
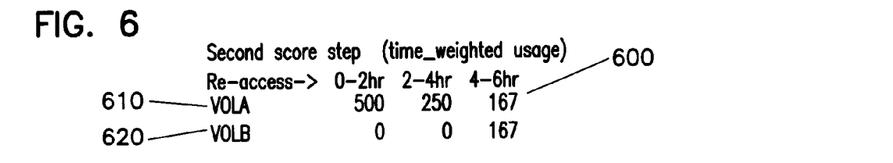
FIG. 6 illustrates the time-weighted scores for the files.

The time-weighted scores 600 for the files are shown in FIG. 6. The time-weighted scores 600 for the first file 610 are calculated as follows:

$$0\text{-}2 \text{ hour} = \frac{500}{1} = 500;$$

$$2\text{-}4 \text{ hour} = \frac{500}{2} = 250;$$

$$4\text{-}6 \text{ hour} = \frac{500}{3} = 167.$$

The time weighted scores for the second file 620 are calculated as follows:

$$0\text{-}2 \text{ hour} = \frac{0}{1} = 0;$$

$$2\text{-}4 \text{ hour} = \frac{0}{2} = 0;$$

$$4\text{-}6 \text{ hour} = \frac{500}{3} = 167.$$

Figure 7:
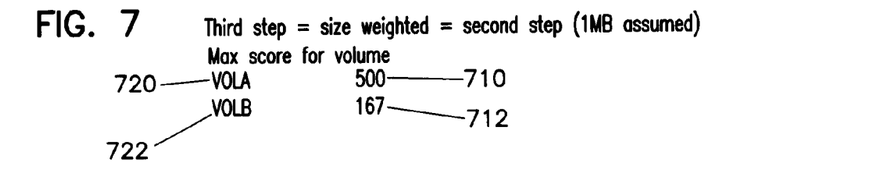
FIG. 7 illustrates the maximum scores for the first and second volumes in the first period.

FIG. 7 illustrates the maximum scores 710, 712 for the first type 720 and second type 722 volumes for all the calculated periods.

Figure 8:
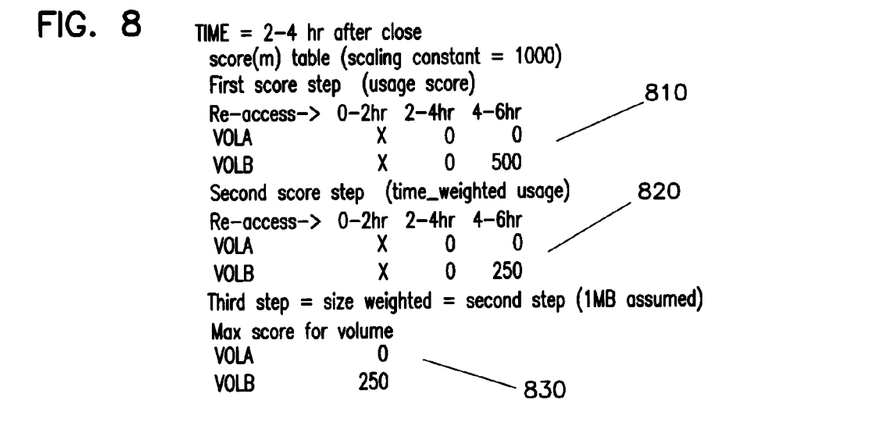
FIG. 8 illustrates the usage scores, time-weighted scores and maximum scores for the 2–4period.

FIG. 8 illustrates the usage scores 810, time-weighted scores 820 and maximum scores 830 for the 2–4 period, representing calculations for files that are 2–4 hours old in the cache. The usage score, time-weighted scores and maximum scores for the 4–6 period, representing calculations for files that are 4–6 hours old in the cache, are calculated similarly.

Figure 9:
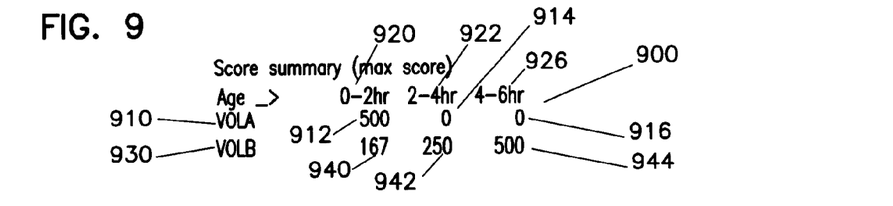
FIG. 9 illustrates the total score summary.

FIG. 9 illustrates the total score summary 900. The first file 910 has a final score of five hundred 912 if it has been in the cache for 0–2 hours 920, zero 914 if it has been in the cache for 2–4 hours 922 and zero 916 if it has been in the cache for 4–6 hours 926. The second file 930 has a final score of one hundred sixty seven 940 if it has been in the cache for 0–2 hours 922, two hundred fifty 942 if it has been in the cache for 2–4 hours 924 and five hundred 944 if it has been in the cache for 4–6 hours 926. An LRU cache would discard whichever volume closed first. In this LRU cache, assuming simultaneous closing for illustrative purposes, each volume has an equal chance of being discarded. The present invention will ensure that the first file 910 is kept if one of the two volumes must be discarded within the first two hours, i.e., the 0–2 hour period 922. Thereafter 922–926, the second file 930 will be kept with the first file 910 being discarded, because the scores for the second file are larger than those of the first file in the 2–4 and 4–6 hour periods.

Figure 10:
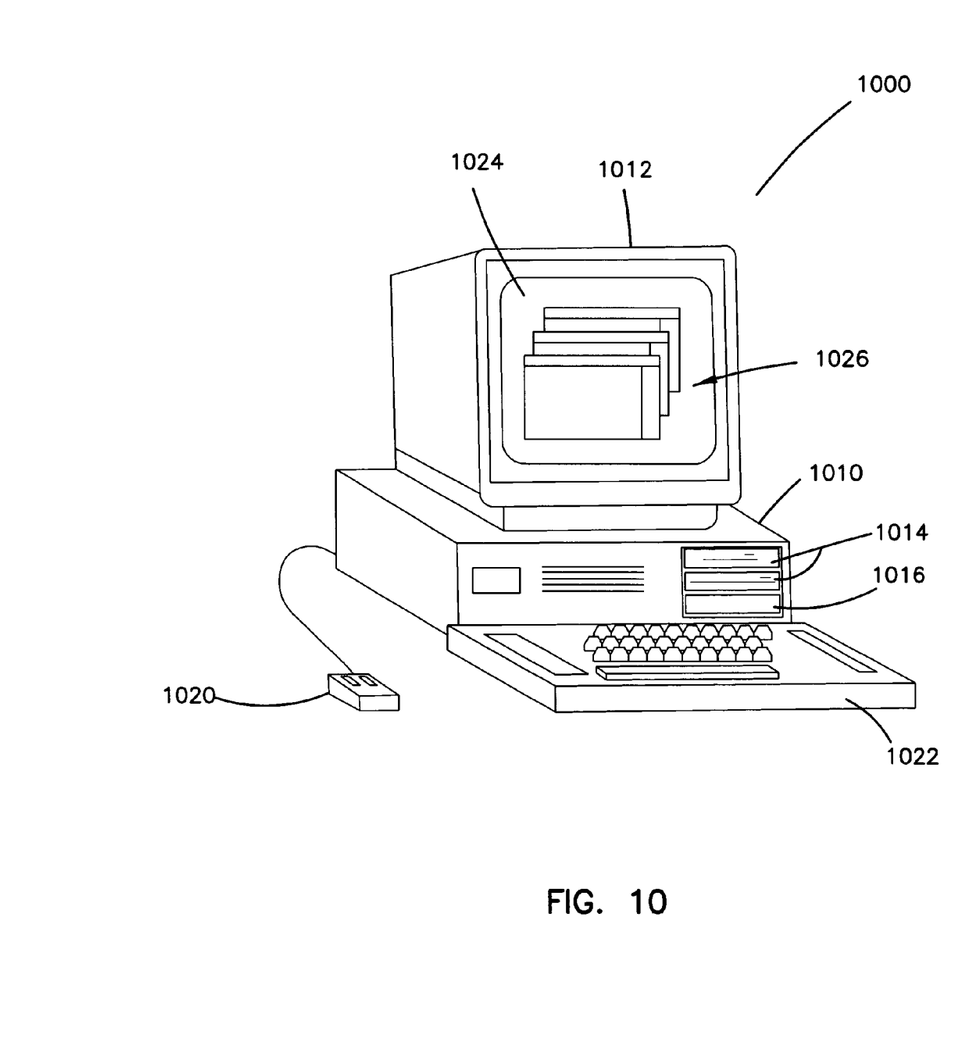
FIG. 10 is a block diagram that illustrates an exemplary hardware environment for performing the improved caching method according to the present invention.

FIG. 10 is a block diagram 1000 that illustrates an exemplary hardware environment for performing the improved caching method according to the present invention. The present invention is typically implemented using a computer 1010 comprised of a microprocessor, random access memory (RAM), read-only memory (ROM), and other components. It is envisioned that attached to the computer 1010 may be a monitor 1012, floppy disk drives 1014, and CD-ROM drives 1016. Also included in the preferred embodiment may be input devices, for example, a mouse pointing device 1020 and a keyboard 1022.

The computer 1010 operates under the control of an operating system 1024, such as the Windows, OS/2, Macintosh, or UNIX operating systems, which is represented in FIG. 10 by the screen display on the monitor 1012. The computer 1010 executes one or more computer programs 1026, which are represented in FIG. 10 by the "windows" displayed on the monitor 1012, under the control of the operating system 1024. The present invention comprises a storage manager that is preferably implemented in the operating system 1024 and/or computer programs 1026.

Generally, the operating system 1024 and the computer programs 1026 may be tangibly embodied in a computer-readable medium or carrier, e.g. one or more of the fixed and/or removable data storage devices 1014 and 1016, or other data storage or data communications devices. Both the operating system 1024 and the computer programs 1026 may be loaded from the data storage devices 1014 and 1016 into the random access memory of the computer 1010 for execution by the microprocessor as discussed above with reference to FIG. 10. Both the operating system 1024 and the computer programs 1026 comprise instructions which, when read and executed by the microprocessor of the computer 1010, causes the computer 1010 to perform the steps necessary to execute the steps or elements of the present invention.

Although an exemplary computer system configuration is illustrated in FIG. 10, those skilled in the art will recognize that any number of different configurations performing similar functions may be used in accordance with the present invention.

In summary, the present invention provides a method and apparatus for improving caching for a virtual tape server which makes assumptions to increase cache hits, but which does not under-perform a LRU algorithm when these assumptions prove to be incorrect. The present invention assumes that files with different characteristics are used differently, that is the host usage of different files has different trends that can be correlated to some externally determined file characteristics. If this assumption is incorrect, the algorithm will function like an LRU algorithm based upon gathered historical data. Therefore, in customers where these predetermined file characteristics have a high correlation with file usage, the method according to the present invention provides an improvement in the cache hit rate which out-performs the LRU algorithms. For those customers that do not have a high correlation, the method according to the present invention does not under-perform an LRU algorithm.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for improving caching in a virtual tape system, comprising the steps of:
  correlating logical volume usage to externally determined file characteristics to derive a usage history for cached logical volumes; wherein the step of correlating further comprises the steps of:
  associating the first logical volume with a logical volume type based on predefined characteristics;
  assigning a time bin for the type of the first logical volume based on the time of last access of the first logical volume therein, the time of current access of the first logical volume and based on the type assigned to the first logical volume at the time the first logical volume was last accessed; and
  updating a usage count in the time bin for the type;
  maintaining a record of the usage history in time bins; and
  managing the migration of the logical volumes according to the usage history and the externally determined file characteristics of the logical volume.

2. The method of claim 1 further comprising the step of calculating a score for a logical volume based upon the size of the first logical volume, the age of the first logical volume, and the historic performance of the other volumes.

3. The method of claim 2 wherein the time bin has data associated therewith, the data in the time bin for the first logical volume being divided by a predetermined number to prevent overrun and to maintain weighted historic data when a total for all time bins reaches a predetermined threshold.

4. The method of claim 2 wherein the score is updated periodically for any cached volume as the cached volume ages.

5. The method of claim 2 wherein the score is updated periodically for all cached volumes.

6. The method of claim 2 wherein the step of updating the score further comprises the steps of:
  determining the age and type of each logical volume;
  selecting a time bucket for the logical volume;
  calculating a usage score for the time bucket;
  computing a time-weighted usage score for the time bucket; and
  identifying a final score for the time bucket.

7. The method of claim 5 wherein the usage score comprises calculating a usage score for all nth time buckets, n>m, wherein the mth time bucket is a current time bucket, and wherein the usage score comprises a scaling constant times the sum of the time buckets for the logical volume between n and m divided by the sum of all time buckets greater than or equal to m plus a number of misses.

8. The method of claim 6 wherein the usage score is proportional to the percentage of cache hits when the cartridge is kept for n−m+1 time intervals.

9. The method of claim 6 wherein the time-weighted usage score for the nth time bucket is equal to the usage score for the nth bucket divided by n−m+1.

10. The method of claim 6 wherein the final score for the logical volume is equal to the maximum of the time-weighted usage score for the nth time buckets.

11. The method of claim 6 wherein the final score for the logical volume is equal to the time-weighted usage score for the logical volume divided by the size of the logical volume.

12. The method of claim 2 further comprising the step of processing logical volumes having an age in excess of a predetermined maximum period according to a size-weighted least recently used basis.

13. The method of claim 2 further comprising the steps of assigning logical volumes having no historic data a 50% hit rate in the first time bucket, and setting the score equal to minus the age of the cartridge times its size.

14. The method of claim 2 further comprising the step of assigning logical volumes having no historic data an average score for all logical volumes.

15. The method of claim 2 wherein the step of managing the migration of the logical volumes according to the usage history and the externally determined file characteristics of the logical volume further comprises the step of migrating a logical volume having the lowest score first.

16. An article of manufacture for a computer-based user-interface, the article of manufacture comprising a computer readable medium having instructions for causing a computer to perform a method comprising the steps of:
  correlating logical volume usage to externally determined file characteristics to derive a usage history for cached logical volumes; wherein the step of correlating further comprises the steps of:
  associating the first logical volume with a logical volume type based on predefined characteristics;
  assigning a time bin for the type of the first logical volume based on the time of last access of the first logical volume therein, the time of current access of the first logical volume and based on the type assigned to the first logical volume at the time the first logical volume was last accessed; and
  updating a usage count in the time bin for the type;
  maintaining a record of the usage history in time bins; and
  managing the migration of the logical volumes according to the usage history and the externally determined file characteristics of the logical volume.

17. The article of manufacture of claim 15 further comprising the step of calculating a score for a logical volume based upon the size of the first logical volume, the age of the first logical volume, and the historic performance of the other volumes.

18. The article of manufacture of claim 16 wherein the time bin has data associated therewith, the data in the time bin for the first logical volume being divided by a predetermined number to prevent overrun and to maintain weighted historic data when a total for all time bins reaches a predetermined threshold.

19. The article of manufacture of claim 16 wherein the score is updated periodically for any cached volume as the cached volume ages.

20. The article of manufacture of claim 16 wherein the score is updated periodically for all cached volumes.

21. The article of manufacture of claim 16 wherein the step of updating the score further comprises the steps of:
  determining the age and type of each logical volume;
  selecting a time bucket for the logical volume;
  calculating a usage score for the time bucket;
  computing a time-weighted usage score for the time bucket; and
  identifying a final score for the time bucket.

22. The article of manufacture of claim 19 wherein the usage score comprises calculating a usage score for all nth time buckets, n>m, wherein the mth time bucket is a current time bucket, and wherein the usage score comprises a scaling constant times the sum of the time buckets for the logical volume between n and m divided by the sum of all time buckets greater than or equal to m plus a number of misses.

23. The article of manufacture of claim 20 wherein the usage score is proportional to the percentage of cache hits when the cartridge is kept for n−m+1 time intervals.

24. The article of manufacture of claim 20 wherein the time-weighted usage score for the nth time bucket is equal to the usage score for the nth bucket divided by n−m+1.

25. The article of manufacture of claim 20 wherein the final score for the logical volume is equal to the maximum of the time-weighted usage score for the nth time buckets.

26. The article of manufacture of claim 20 wherein the final score for the logical volume is equal to the time-weighted usage score for the logical volume divided by the size of the logical volume.

27. The article of manufacture of claim 16 further comprising the step of processing logical volumes having an age in excess of a predetermined maximum period according to a size-weighted least recently used basis.

28. The article of manufacture of claim 16 further comprising the steps of assigning logical volumes having no historic data a 50% hit rate in the first time bucket, and setting the score equal to minus the age of the cartridge times its size.

29. The article of manufacture of claim 16 further comprising the step of assigning logical volumes having no historic data an average score for all logical volumes.

30. The article of manufacture of claim 16 wherein the step of managing the migration of the logical volumes according to the usage history and the externally determined file characteristics of the logical volume further comprises the step of migrating a logical volume having the lowest score first.

31. A virtual tape server, comprising:
primary storage media for storing intensively used and frequently accesses data, the data being transferred to the primary storage media as logical volumes;
secondary storage media, coupled to the primary storage media, for storing less frequently accesses logical volumes and forming a library;
a library manager, coupled to the secondary storage media, for controlling access to the logical volumes stored on the secondary storage media;
a distributed storage manager, operatively coupled to the primary and secondary storage media, for moving logical volumes between the primary and secondary storage media, the distributed storage manager further comprising a distributed storage manager server and a hierarchical storage manager client; and
an automatic storage manager administrator, coupled to the distributed storage manager, for controlling the distributed storage manager, the automatic storage manager administrator managing the caching of logical volumes in the virtual tape system by correlating logical volume usage to externally determined file characteristics to derive a usage history for cached logical volumes, maintaining a record of the usage history in time bins and managing the migration of the logical volumes according to the usage history and the externally determined file characteristics of the logical volume; wherein the automatic storage manager administrator further correlates logical volume usage to externally determined file characteristics by associating the first logical volume with a logical volume type based on predefined characteristics, assigning a time bin for the type of the first logical volume based on the time of last access of the first logical volume therein, the time of current access of the first logical volume and based on the type assigned to the first logical volume at the time the first logical volume was last accesses and updating a usage count in the time bin for the type.

32. The virtual tape server of claim 29 wherein the automatic storage manager calculates a score for a logical volume based upon the size of the first logical volume, the age of the first logical volume, and the historic performance of the other volumes.

33. The virtual tape server of claim 30 wherein the time bin has data associated therewith, the data in the time bin for the first logical volume is divided by a predetermined number to prevent overrun and to maintain weighted historic data when a total for all time bins reaches a predetermined threshold.

34. The virtual tape server of claim 30 wherein the score is updated periodically for any cached volume as the cache volume ages.

35. The virtual tape server of claim 30 wherein the score is updated periodically for all cached volumes.

36. The virtual tape server of claim 30 wherein the automatic storage manager administrator further comprises:
means for determining the age and type of each logical volume;
means for selecting a time bucket for the logical volume;
means for calculating a usage score for the time bucket;
means for computing a time-weighted usage score for the time bucket; and
means for identifying a final score for the time bucket.

37. The virtual tape server of claim 33 wherein the calculating means calculates a usage score for all nth time buckets, n>m, wherein the mth time bucket is a current time bucket, and wherein the usage score comprises a scaling constant times the sum of the time buckets for the logical volume between n and m divided by the sum of all time buckets greater than or equal to m plus a number of misses.

38. The virtual tape server of claim 34 wherein the usage score is proportional to the percentage of cache hits when the cartridge is kept for n−m+1 time intervals.

39. The virtual tape server of claim 34 wherein the time-weighted usage score for the nth time bucket is equal to the usage score for the nth bucket divided by n−m+1.

40. The virtual tape server of claim 34 wherein the final score for the logical volume is equal to the maximum of the time-weighted usage score for the nth time buckets.

41. The virtual tape server of claim 34 wherein the final score for the logical volume is equal to the time-weighted usage score for the logical volume divided by the size of the logical volume.

42. The virtual tape server of claim 30 wherein the automatic storage manager administrator processes logical volumes having an age in excess of a predetermined maximum period according to a size-weighted least recently used basis.

43. The virtual tape server of claim 30 wherein the automatic storage manager administrator assigns logical volumes having no historic data a 50% hit rate in the first time bucket, and sets the score equal to minus the age of the cartridge times its size.

44. The virtual tape server of claim 30 wherein the automatic storage manager administrator assigns logical volumes having no historic data an average score for all logical volumes.

45. The virtual tape server of claim 30 wherein the automatic storage manager administrator migrates logical volumes having the lowest score first.

* * * * *

UNITED STATES PATENT AND TRADEMARK OFFICE
CERTIFICATE OF CORRECTION

PATENT NO. : 6,269,423 B1
DATED : July 31, 2001
INVENTOR(S) : Kishi

It is certified that error appears in the above-identified patent and that said Letters Patent is hereby corrected as shown below:

Column 1,
Line 28, delete "a" after 'In';
Line 52, add -- to -- after 'prior';

Column 2,
Line 12, replace "preferably" with -- preferable --;
Lines 27 and 39, replace "a" with -- an --;

Column 4,
Line 42, replace "an" with -- a --;
Line 52, delete "a" after 'the';

Column 6,
Line 62, replace "files" with -- file --;

Column 8,
Line 53, replace "a" with -- an --.

Signed and Sealed this

Eighteenth Day of June, 2002

*Attest:*

*Attesting Officer*

JAMES E. ROGAN
*Director of the United States Patent and Trademark Office*